Sept. 26, 1961 G. A. GAEBLER 3,001,782
CONTROLLED SPRING SYSTEM
Filed Jan. 2, 1958 2 Sheets-Sheet 1

INVENTOR.
GUSTAV A. GAEBLER
BY
RICHEY, McNENNY & FARRINGTON
Donald W. Farrington
ATTORNEYS 3,001,782
CONTROLLED SPRING SYSTEM
Gustav A. Gaebler, Friedrich-Ebert-Strasse 2, Langen, Germany
Filed Jan. 2, 1958, Ser. No. 706,711
4 Claims. (Cl. 267—11)

In spring systems, especially those for vehicles and particularly vehicles for passenger transport, there has been lately an increasing tendency to use springs and spring systems having an extraordinary degree of softness. Typical springs for this purpose are, for instance, rubber and air or gas springs which have been used increasingly in recent times, but also very soft metal springs. Opposing the development of very soft springs having inherently very low oscillating frequencies (e.g. below 1 cycle per sec.) has been the necessity, in order to deal with impulses coming from outside, either from the road or from the spring-mounted vehicle part, to attain the readjusting forces necessary for correcting the position of the vehicle. With increasing flatness of the spring curves (spring force plotted against spring movement) the available readjusting forces necessarily decrease.

There are known spring systems operating with springs of different characteristics arranged one behind the other and which consequently make it possible to obtain a soft curve in the central area and a harder curve in the outer areas. Furthermore, there are known spring systems, especially gas or air springs and also rubber springs with vehicle leveling means. In air spring systems of the more recent types for this purpose the pressure in the spring is changed by pumping in or letting out air. Other systems have also been devised in an effort to permit the use of very soft springs.

None of the above devices, however, attain the results achieved by the present invention which increases the readjusting force of a spring system, after a predetermined amount of movement of the spring in either direction, by the application of a quick acting restoring force reinforcing the restoring forces of the spring system itself. The additional restoring force is obtained by means of a member which may operate with incompressible media, such as oil, or with compressible media, such as gases, and which is operatively connected either with the damping device for the spring or with the spring itself.

In the accompanying drawings which illustrate a preferred embodiment of the invention, FIG. 1 is a diagrammatic view of a vehicle equipped with air springs and hydraulic shock absorbers with the means for producing the additional restoring force combined with the shock absorbers;

Figure 1:
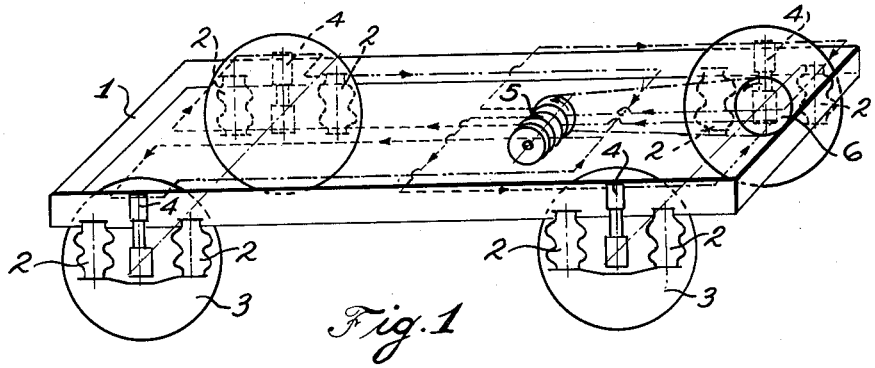
Figure 2:
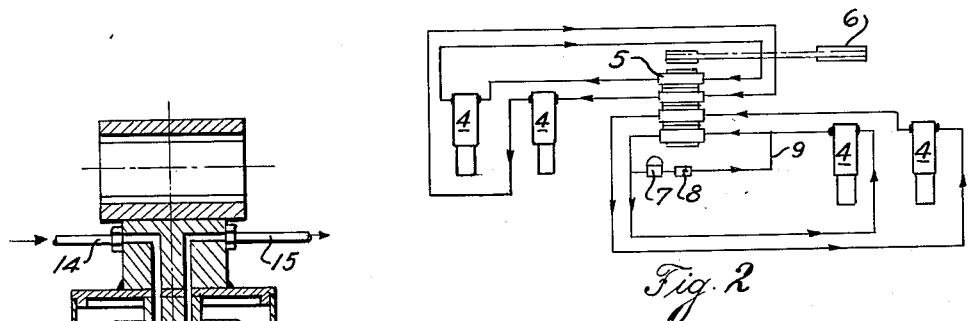
FIG. 2 is a diagram showing the connections between the four shock absorbers and the pumps of FIG. 1.
Figure 3:
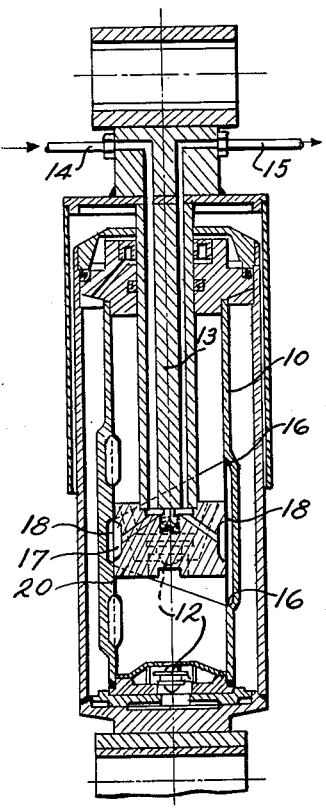
FIG. 3 is a longitudinal section through one of the shock absorbers of FIG. 1 showing the piston in the center of its normal operating range.

Referring to FIGS. 1 to 5, the vehicle frame 1 is resiliently supported by the springs 2 on the wheel-carrying axles 3 in the usual manner. Parallel to these springs shock absorbers 4 are arranged in the conventional manner. Such shock absorbers, however, if they are constructed and used in the usual way, are only capable of exerting a damping effect dependent upon the velocity of the spring movement. In order to enable them upon moving of the spring to bring about a change of position of the non-elastic part beyond the usual degree, these shock absorbers are operatively connected in a manner detailed below with a fluid pressure producing device 5 so as to apply pressure fluid to that piston side of the absorber which becomes active when the normal spring path is exceeded and thus to force the piston to move in dependence on the conveyed amount of oil until the piston again will have reached the position required in the medium operating area of the spring. An example of such a system is illustrated in the diagram of FIG. 2. The fluid pump 5 actuated by the pulley on the vehicle axle 6 has four separate pump chambers each of which is connected with one of the four shock absorbers. The internal structure of the novel shock absorber is shown in FIG. 3. The absorber which consists of the conventional cylinder bore 10 and the double-acting absorbing piston 20 and is provided with the usual relief valves 12, has a piston rod 13 with holes through which the oil conveyed by the pump 5 is carried into the interior of the absorber and is then either carried out of the absorber through a short circuit to the suction side of the pump or is pressed above or below the piston of the absorber from where it may flow back after the operation by the same return path to the pump, depending upon the position of the controlling edges.

Figure 4:
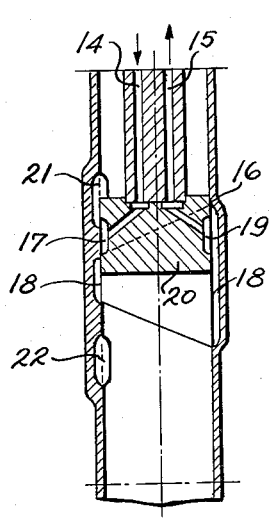
FIG. 4 is a view similar to FIG. 3 with parts omitted showing the piston above its normal operating range in position to apply an additional restoring force in a direction to compress the spring.
Figure 5:
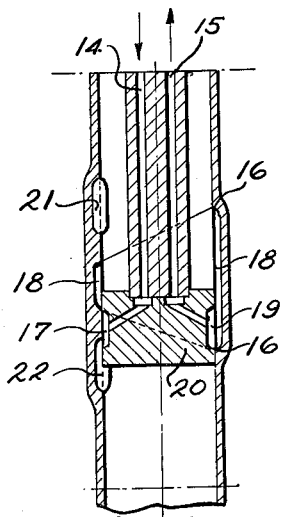
FIG. 5 is a sectional view similar to FIG. 4 showing the piston below its normal operating range and in position to apply an additional restoring force to extend the spring.

The three positions of the piston in the cylinder of the absorber which are necessary for explaining the manner of operation are shown in FIGS. 3, 4 and 5.

FIG. 3 illustrates the piston in the center of its normal operating range in which the shock absorber provides neither a damping action nor a restoring force. The cylinder bore 10 is formed with an annular recess 18 bounded by upper and lower edges 16 which lie in planes inclined oppositely to the axis of the cylinder so that on the left-side, as shown in FIGS. 3, 4 and 5, the upper and lower edges 16 are relatively close to each other and on the opposite side they are spaced apart a greater amount. The edges 16 may be spaced and inclined as illustrated, or may be positioned closer together or with less inclination so as to maintain at all times a bearing of more than 180° between the piston and the cylinder bore. In accordance with conventional shock absorber constructions one or more passages extend from one side of the piston 20 to the other controlled by the conventional relief valve or valves 12 which may be spring-loaded to retard flow in either direction from one side of the piston to the other to provide the desired damping action, or the passages may simply be restricted in size to retard flow in either direction.

In a conventional shock absorber the cylinder 10 is enclosed within a larger cylinder, the space between the two cylinders providing the compensating chamber. The lower side of the cylinder 10 below the piston 20 is in communication with the compensating chamber by a passage controlled by a conventional check valve 12 having a small metered orifice to retard fluid flow from the interior of the cylinder 10 into the compensating chamber to provide the damping action. The check valve opens to permit free fluid flow from the compensating chamber to the lower end of the cylinder 10 so as to avoid cavitation below the piston 20. When used with the present system, however, the valve in the bottom of the cylinder 10 may be closed off or omitted, and the difference in displacement created by the piston rod 13 compensated through the pump circuit.

The exterior cylindrical surface of the piston 20 is formed on one side with a shell-like recess 17 on its opposite side with a similar shell-like recess 19. The recess 17 registers with the annular recess 18 at its narrowest point and the recess 19 registers with the recess 18 at the widest point of the latter. The interior of the cylinder 10 is also formed with shell-like recesses 21 and 22 similar in shape to the recess 17 and in axial alignment therewith. The recesses 21 and 22 are spaced, respectively, above and below the recess 18 a distance slightly less than the axial extent of the recess 17.

When the piston 20 is in its middle position as illustrated in FIG. 3, oil or other hydraulic fluid from the pump 5 passes through the supply line 14 extending through the piston rod 13 and the piston 20 and opening into the recess 17. Since the recess 17 is in communication with the annular recess 18 the fluid flows around the cylinder through the recess 18 and enters the recess 19 which is in communication with the return line 15 extending to the intake side of the pump. Thus, in the central position as illustrated in FIG. 3 fluid is circulated from the supply line 14 to the return line 15 without substantial resistance except the flow resistance of the passages. Similarly, the fluid which fills the cylinder 10 above the piston 20 is in free communication through the annular recess 18 with the fluid filling the cylinder 10 below the piston 20 so that the shock absorber provides no damping action or resistance to small movements of the piston 20 in either direction, the difference of displacement on opposite sides of the piston created by the piston rod 13 being compensated by variations in flow through the supply and return lines 14 and 15. If, however, the spring is strongly relieved so that the piston 20 moves upwardly in the cylinder 10 to the position shown in FIG. 4, the upper edge 16 of the annular recess 18 is passed by the lower edge of the recess 17 and is also passed, on the opposite side, by the upper edge of the piston itself. In this position the recess 17 and the supply line 14 are no longer in communication with the recess 18, and similarly the cylinder space above the piston 20 is no longer in communication with the recess 18. Before reaching this position the upper edge of the recess 17 passes over the lower edge of the recess 21 so that the supply line 14 is placed in communication through the recesses 17 and 21 with the cylinder space above the piston 20. Further upward movement of the piston 20 is resisted by the pressure required to force the oil trapped in the upper part of the piston to the lower side of the piston through the valve or restricted passage 12. The restriction of the fluid flow from the pump builds up additional pressure above the piston 20. As the upward velocity of the piston decreases the downward pressure of the oil on the upper face of the piston nevertheless remains high since the pump 5 continues to force oil into the space above the piston and through the valve or restricted passage 12 in the piston. Thus, throughout the deceleration of the upward movement of the piston 20 after it has reached the position shown in FIG. 4, and throughout the downward movement back to that position, work is performed by the oil delivered by the pump 5 which aids in restoring the spring to its normal position. The restoring force is applied immediately and without the delay which is inherent in the oscillation of a spring or the inertia of a vehicle.

In the event the piston is forced downwardly to the position shown in FIG. 5, the reverse action takes place. When the piston reaches the position shown in FIG. 5 the recess 17 passes the lower edge 16 of the annular recess 18 and opens into the recess 22, providing communication between the supply line 14 and the cylinder space below the piston 20. At the same time the lower surface of the piston passes the edge 16 at the widest point of the recess 18 so that the incoming fluid from the supply line 14 must pass upwardly through the piston and the valve or restricted passage 12 in order to reach the upper side of the piston and the return line 15. Thus, during further downward movement from the position shown in FIG. 5, and throughout the return upward movement to that position, the oil supplied by the pump 5 performs work acting to restore the spring to its normal central position.

In order to avoid any effects resulting from a change of temperature or against minor losses from oil leakage, as well as to assist in compensating for the piston rod 13, the circulating amount of oil may always be readjusted, as is shown schematically in FIG. 2 by providing a small accumulator 7 into which oil may be forced against the pressure of compressed gas or a spring. Each circuit from a pump to a shock absorber may also be protected against excessive increase in pressure by a spring-loaded relief or safety valve 8 connected to a circuit line 9 around the pump.

Figure 6:
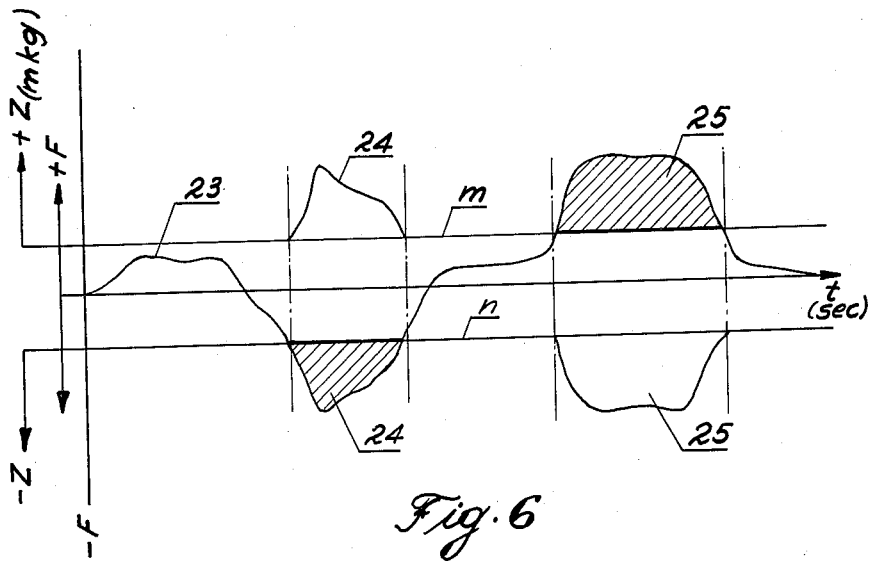
FIG. 6 is a diagram indicating the work performed by the main spring and by the restoring device in accordance with this invention.

The system is also illustrated by the diagram of FIG. 6. The curve 23 shows the course of the spring work of the main spring 2 in the central area, the spring work being given in kilogram-meters above the time in seconds. In the absence of a restoring device the spring, under the influence of stronger impulses, would have to perform the work shown, for instance, by the areas 24 or 25 in order to restore the spring mounted part of the vehicle to its normal position. In case the spring is very soft, however, it would not exert sufficient additional force to perform the necessary work within the permissible limits of movement. Even under lesser impulses the spring would require too long a time to perform the restoring work because of the low oscillating frequency inherent in soft spring. The restoring device permits the spring to do all of the restoring work during a central range of movement of predetermined extent, but under the influence of the less frequent but stronger impulses moves either to the position of FIG. 4 or FIG. 5 and performs the adjusting work indicated by the areas 24 or 25. Scale F on the ordinate of FIG. 6 shows the measure for the spring work in positive and negative directions and scale Z represents, also in the positive and negative directions, the measure for the restoring work.

While a particular presently-preferred embodiment of the invention has been shown and described, it is to be understood that various modifications, omissions and refinements which depart from the disclosed embodiment may be adopted without departing from the spirit and scope of this invention.

What is claimed is:

1. In a spring system for a vehicle which comprises a chassis, an axle, a spring supporting the chassis from the axle, and a double-acting hydraulic shock absorber connected to said chassis and axle and having cylinder means with opposed cylinder ends connected by a metered passage and piston means connected to be moved into either of said cylinder ends to resist movement of said axle either toward or away from said chassis; means actuable to supply an increased restoring force comprising pressure liquid supply means, valved inlet passage means adapted to connect said supply means with either of said cylinder ends, valved exhaust passage means adapted to be connected with either of said cylinder ends and valve means having relatively movable parts connected to said chassis and to said axle, respectively, and arranged to connect either one of said cylinder ends with said inlet passage means and disconnect the same from said exhaust passage means and at the same time disconnect the remaining cylinder end from said inlet passage means and connect said remaining cylinder end with said exhaust passage means upon a predetermined amount of movement of said piston means into said one cylinder end.

2. In a spring system for a vehicle which comprises a chassis, an axle, a spring supporting the chassis from the axle, and a double-acting hydraulic shock absorber connected to said chassis and axle and having cylinder means with opposed cylinder ends connected by a metered passage and piston means connected to be moved into either of said cylinder ends to resist movement of said axle either toward or away from said chassis; means actuable to supply an increased restoring force comprising a hydraulic fluid circuit including a pump connected to fluid delivery and fluid return passages and valve means having relatively movable parts connected to said chassis and to said axle, respectively, and arranged to connect either one of said cylinder ends with said fluid delivery passage and disconnect the same from said fluid return passage and simultaneously connect the other of said cylinder ends to said fluid return passage and disconnect said other cylinder end from said fluid delivery passage upon a predetermined amount of movement of said piston means into said one cylinder end.

3. In a spring system for a vehicle which comprises a chassis, an axle, a spring supporting the chassis from the axle, and a double-acting fluid operated shock absorber connected to said chassis and axle and having cylinder means with opposed cylinder ends connected by a metered passage and piston means connected to be moved into either of said cylinder ends to resist movement of said axle either toward or away from said chassis; means actuable to supply an increased restoring force comprising pressure fluid supply means, valved inlet passage means adapted to connect said supply means with either of said cylinder ends, valved exhaust passage means adapted to be connected with either of said cylinder ends, said cylinder ends and piston means being formed with valve ports arranged to connect either one of said cylinder ends with said inlet passage means and disconnect said one cylinder end from said exhaust passage means and at the same time disconnect the remaining cylinder end from said inlet passage means and connect the remaining cylinder end to said exhaust passage means upon a predetermined amount of movement of said piston means into said one cylinder end.

4. A controlled spring system for a vehicle comprising an air spring arranged between the axle and the chassis of the vehicle, a hydraulic shock absorber mounted between the axle and frame of the vehicle, a hydraulic system including a pump mounted on the frame of the vehicle, said shock absorber including a cylinder mounted on the axle, a piston rod mounted on the frame whereby the cylinder moves relative to the piston rod during motion of the axle relative to the frame, said piston rod having an inlet bore extending longitudinally through the rod, a piston secured to the end of the piston rod and arranged to be reciprocated in said cylinder, an outlet bore extending longitudinally of the piston rod and terminating in said piston, said piston having a first recess on one side of the cylindrical wall thereof adjacent said outlet bore, a passageway formed in the piston leading from said recess to said outlet bore, a second recess on that side of the piston adjacent the inlet bore, a passageway leading from said second recess to said inlet bore, said cylinder having an annular recess in the inner wall thereof intermediate the ends of the cylinder communicating with said first and second recesses and with said cylinder on both sides of said piston when the piston is at an intermediate point of its travel in the cylinder, said cylinder having inlet recesses axially spaced on opposite sides of said annular recess adapted to register with said second recess in said piston upon predetermined movement of said piston in either direction from said intermediate point to conduct fluid from said inlet bore to said cylinder on the adjacent side only of said piston.

References Cited in the file of this patent

UNITED STATES PATENTS

| | | |
|---|---|---|
| 1,244,752 | McCrosson | Oct. 30, 1917 |
| 1,861,821 | Schaum | June 7, 1932 |
| 2,361,575 | Thompson | Oct. 31, 1944 |
| 2,506,726 | Magrum | May 9, 1950 |
| 2,568,401 | Lynn et al. | Sept. 18, 1951 |
| 2,756,046 | Lucien | July 24, 1956 |